United States Patent [19]
McDermott

[11] Patent Number: 5,428,471
[45] Date of Patent: Jun. 27, 1995

[54] FAIL-SAFE AUTOMATIC SHUT-DOWN APPARATUS AND METHOD FOR HIGH OUTPUT POWER OPTICAL COMMUNICATIONS SYSTEM

[75] Inventor: Thomas C. McDermott, Plano, Tex.

[73] Assignee: Alcatel Network Systems, Inc., Richardson, Tex.

[21] Appl. No.: 922,256

[22] Filed: Jul. 30, 1992

[51] Int. Cl.$^6$ .............................................. H04B 10/08
[52] U.S. Cl. ..................... 359/177; 359/110; 359/112; 370/14; 379/6
[58] Field of Search ............... 359/110, 112, 177, 179, 359/143; 370/13.1, 14, 17; 379/2, 4, 6, 26

[56] References Cited

U.S. PATENT DOCUMENTS

| | | | |
|---|---|---|---|
| 5,099,349 | 3/1992 | Yoshida | 359/161 |
| 5,130,837 | 7/1992 | Kitamura | 359/177 |

FOREIGN PATENT DOCUMENTS

| | | | |
|---|---|---|---|
| 320763 | 1/1982 | Germany | |
| 3201375 | 7/1983 | Germany | 359/177 |
| 0061237 | 4/1984 | Japan | 359/110 |
| 59-85678 | 4/1984 | Japan | |
| 0127833 | 7/1985 | Japan | 359/177 |
| 0229433 | 11/1985 | Japan | 359/110 |
| 0260231 | 10/1988 | Japan | 359/110 |
| 0146831 | 6/1990 | Japan | 359/110 |
| 2051355 | 5/1980 | United Kingdom | |
| 2251148 | 9/1991 | United Kingdom | |

OTHER PUBLICATIONS

Hamanaka T., et al., "A New 140 Mbps Fiber-Optic Transmission System," NEC Research and Development, No. 78, Jul. 1985, Tokyo, Japan, pp. 62–70.

Primary Examiner—Leslie Pascel
Attorney, Agent, or Firm—Baker & Botts

[57] ABSTRACT

In a fiber-optic communications system, a shut-down apparatus in the event of a fiber-optic cable disruption includes a first optical fiber cable for propagating signals in a first direction and having a plurality of adjacent amplifiers disposed along the first cable. A second optical fiber cable for propagating signals in a second direction, opposite the first direction, includes a plurality of adjacent amplifiers disposed along the second cable. Each of the amplifiers in the second optical fiber cable are interconnected to one of the amplifiers of the first optical fiber cable to form a plurality of amplifier pairs. Circuitry is provided for terminating operation or reducing the output power level of an amplifier within the first or second optical fiber cables in the event of a cable disruption between adjacent amplifier pairs, such that an amplifier within an amplifier pair adjacent to the cable disruption terminates generation or reduces its power level to a safe level at its output. Circuitry is further provided for generating a continuity signal on the first and second cables at the output of each of the amplifiers. Circuitry is provided for sensing the continuity signal upon elimination of the cable disruption to thereby actuate the input of the amplifier within an amplifier pair adjacent to the cable disruption to thereby automatically reestablish communication along the previously disrupted cable.

16 Claims, 1 Drawing Sheet

FAIL-SAFE AUTOMATIC SHUT-DOWN APPARATUS AND METHOD FOR HIGH OUTPUT POWER OPTICAL COMMUNICATIONS SYSTEM

TECHNICAL FIELD OF THE INVENTION

The present invention relates to fiber optic communications systems, and more particularly to a safety mechanism that is activated in the event of a disconnected, broken, or cut optical fiber.

BACKGROUND OF THE INVENTION

Optical fiber communications systems utilize optical amplifiers such as, for example, erbium-doped optical amplifiers. These amplifiers can generate a significant amount of optical power within an optical fiber under normal operation conditions. In the event of a disconnected, broken, or cut optical fiber, hereinafter referred to as a cable disruption, there is the possibility that hazardous amounts of this optical energy can emerge from the disrupted end of the optical fiber. Optical energy emerging from the end of the optical fiber may be hazardous to the human eye under certain conditions. It is therefore desirable to detect a cable disruption to automatically shut down an optical amplifier until the condition is repaired, thereby possibly preventing an overexposure of a person's eye to the optical energy.

A need thus exists for a fail-safe system for use in a fiber-optic communications system for locally and automatically terminating operation of an optical amplifier or for reducing the output power level of the amplifier to a safe level without reliance on outside mechanisms to perform such a safety feature.

SUMMARY OF THE INVENTION

In accordance with the present invention, in a fiber-optic communications system, a shut-down apparatus in the event of a fiber-optic cable disruption is provided. The apparatus includes a first optical fiber cable for propagating signals in a first direction and having a plurality of adjacent amplifiers disposed along the first cable. Each of the amplifiers includes an input and an output. A second optical fiber cable is provided for propagating signals in a second direction, opposite the first direction, and includes a plurality of adjacent amplifiers disposed along the second cable. Each of the amplifiers in the second cable includes an input and an output. Each of the amplifiers in the second optical fiber cable are interconnected to one of the amplifiers of the first optical fiber cable to form a plurality of amplifier pairs. Circuitry is provided for terminating operation of an amplifier or reducing power output to a safe level within the first or second optical fiber cables in the event of a cable disruption between adjacent amplifier pairs, such that an amplifier within an amplifier pair adjacent to the cable disruption terminates generation at its output. Circuitry is further provided for generating a continuity signal on the first and second cables at the output of each of the amplifiers. Circuitry is provided for sensing the continuity signal upon elimination of the cable disruption to thereby actuate the input of the amplifier within an amplifier pair adjacent to the cable disruption to thereby automatically reestablish communication along the previously disrupted cable.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
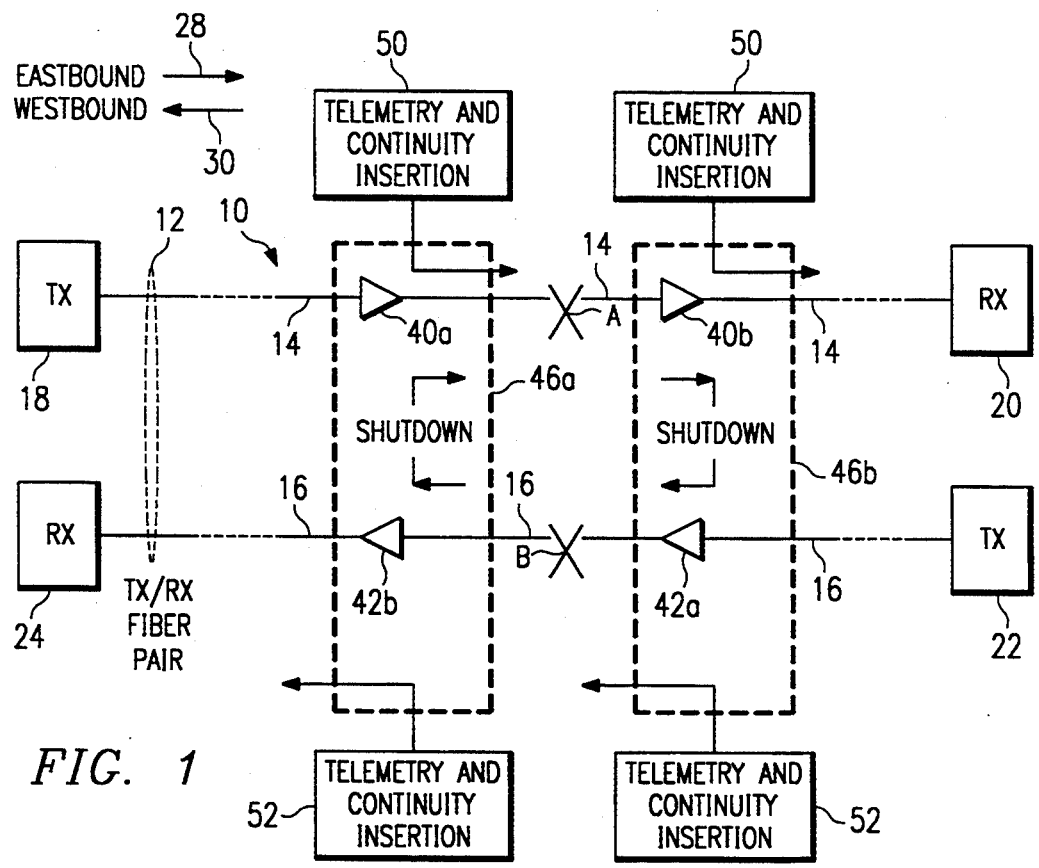
FIG. 1 is a block diagram of a fiber-optic communications system utilizing the present invention.

Referring to FIG. 1, a fiber-optic communications system is illustrated, and is generally identified by the numeral 10. System 10 includes an east-to-west and west-to-east fiber-optic bidirectional cable pair 12 composed of cables 14 and 16. Propagation of signals along cables 14 and 16 are in opposite directions. Cable 14 includes a transmitter 18 and a receiver 20. Cable 16 includes a transmitter 22 and a receiver 24. Transmission along cable 14 occurs, for example, in the eastbound direction indicated by arrow 28. Transmission along cable 16 occurs, for example, in the westbound direction indicated by arrow 30.

Eastbound signals occurring along cable 14 are specifically paired with transmitter 18 and receiver 20. Signals along cable 16 are specifically paired with transmitter 22 and receiver 24.

Disposed along cable 14 are a plurality of optical amplifiers 40, amplifiers 40a and 40b being illustrated in FIG. 1. Disposed along cable 16 are a plurality of amplifiers 42, amplifiers 42a and 42b being illustrated in FIG. 1. Amplifiers 40 and 42 are paired within optical repeaters 46. Amplifier 40a and amplifier 42b are paired within optical repeater 46a. Similarly, amplifiers 40b and 42a are paired within optical repeater 46b. System 10 includes a plurality of repeaters 46 depending upon the specific configuration of system 10.

Associated with each amplifier 40 is a telemetry and continuity signal generator 50 which inserts a telemetry and/or continuity signal, to be subsequently described, at the output of each amplifier 40 along cable 14. Similarly, a telemetry and/or continuity signal generator 52 is associated with each amplifier 42 along cable 16.

In operation of the present system 10, in the event of a disruption in cable 14 due to a disconnection, break or cut within cable 14, such as for example at point A, the input to optical repeater 46b at amplifier 40b terminates. This loss of optical continuity detected by amplifier 40b, causes amplifier 42a within cable 16 to shut down or reduce its output power to a safe level in the westbound output. As used herein, the term "shut down" will also include operation of an amplifier at a reduced safe output power level. Shut down of amplifier 42a is similar to a cable disruption occurring at point B of cable 16 to provide a loss of optical signal along cable 16. This loss of optical signal (and specifically loss of the continuity signal) is detected by amplifier 42b and causes amplifier 40a to shut down, thereby terminating or reducing the generation of optical energy within cable 14 at point A. Both directions of optical signals are affected in the event that either direction of outage is detected within cables 14 or 16 between repeaters 46a and 46b. System 10 is fail-safe because each repeater 46 locally makes a determination of system safety. A failure of either cable 14 or 16 or an amplifier 40 or 42 in either signal direction causes a complete shutdown of repeater pair 46a and 46b adjacent points A and B, until both cables 14 and 16 are functioning normally.

An important aspect of the present invention relates to the restarting of system 10 after a fault is cleared. Since amplifiers 40a and 42a are shut down, even after the disruption at point A or point B of cables 14 or 16, respectively, is repaired, the amplifiers 40a and 42a could not be turned back on again or restored to full power, because there is no optical signal in both cables 14 and 16 since amplifiers 40a and 42a were previously shut down. In order to restart system 10, the present invention utilizes a continuity signal injected after the output of each amplifier 40a and 42a. This continuity signal represents a second optical carrier, of lower power than the communications signal, and is transmitted continuously even though amplifiers 40a and 42a may be shut down. Since this continuity signal is of low power, it presents no hazard to the human eye even under fault conditions present within cables 14 or 16. The continuity signal is of sufficient power to be detected within a repeater pair 46a and 46b after the disruption in a cable 14 or 16 has been eliminated. The presence of the continuity signal at both amplifiers 40b and 42b causes amplifiers 40a and 42a to restore power to the normal level to thereby restart system 10. Once both of amplifiers 42b and 40b detect optical input signals, amplifiers 40a and 42a will be restored to normal output power levels.

Therefore, it can be seen that, after 40b detects loss of the continuity signal, amplifier 40a can only be restored to its normal output power level when amplifier 42a detects the presence of the continuity signal generated by generator 50 associated with repeater 46a. It is only when amplifier 40b detects the continuity signal generated by generator 50 associated with repeater 46a, and amplifier 42b detects the continuity signal generated by generator 52 associated with repeater 46b, that amplifier 42b can actuate amplifier 40a to restore amplifier 40a to its normal output power level. The continuity signal received by amplifier 40b indicates either that continuity is present in cable 14 or that continuity is not present in cable 14. Amplifier 42b also receives the continuity signal generated by generator 52 associated with repeater 46b. Therefore, neither amplifiers 40a or 42a can be restored to normal output power levels until it is determined that both cables 14 and 16 between repeaters 46a and 46b are free from disruption.

Figure 2:
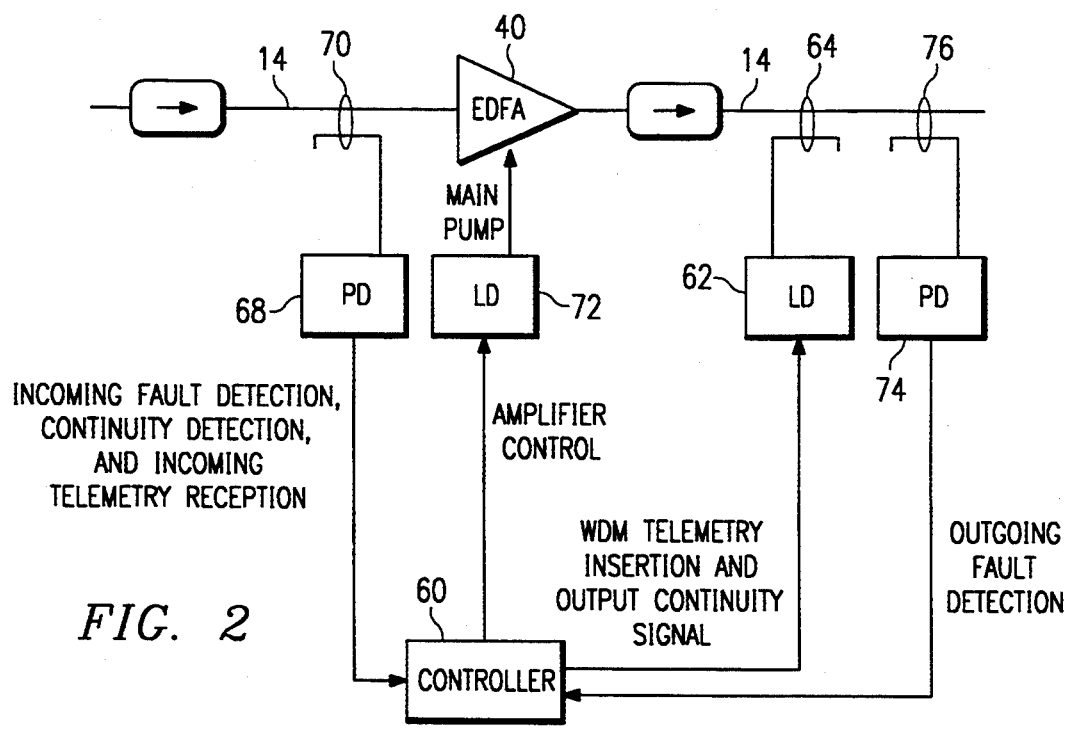
FIG. 2 is block diagram of the components associated with the continuity signal generation and detection system of the present invention.

Referring to FIG. 2, circuity associated with telemetry and continuity signal generator 50 is illustrated. Generators 50 and 52 are similarly configured. Generator 50 includes a controller 60. Controller 60 generates the continuity signal and via a laser diode 62 and optical coupler 64 inputs this signal onto cable 14. If there is a traffic signal present, the continuity signal is superimposed thereon (i.e., it is additive). It should be noted that this concept is also applicable to electrical signals. Either of these may be amplitude modulated. Controller 60 also detects an incoming continuity signal via a photodetector 68 and optical coupler 70. Upon detection of an incoming continuity signal and with information indicating acceptable reverse direction cable continuity, controller 60 activates a laser diode 72 which in turn actuates amplifier 40. Generator 50 may also include an outgoing fault detection photodiode 74 and optical coupler 76 for determining failure of block 72 or block 40 if photodetector 68 detects an incoming signal. Continuity detection at amplifier 40b, for example, determines the status of loss of input to amplifier 40b (from point A) and conveys this information to controller 60 at amplifier 42a which transmits this information via laser diode 62 and coupler 64 to amplifier 42b and controller 60, via photodiode 68 and coupler 70.

The continuity signal may also be combined with telemetry data to be carried between optical repeater sites and to other parts of system 10. The continuity signal and telemetry data do not pass through amplifier 40 or 42 and are separately detected from the signals generated by amplifiers 40 and 42. The telemetry data may indicate, for example, status messages passed up or down system 10 independent of the actual traffic along cables 14 and 16. The telemetry data in combination with the continuity signal can be utilized for determining the location of a disruption along cables 14 or 16 between repeaters 46. Repeater 46 therefore operates as an efficient device in that each repeater monitors input power, functions as a telemetry receiver and as an input continuity detector as well as an output signal insertion device for transmitting both telemetry and continuity indications. The continuity signal is inserted downstream of an amplifier 40 or 42 and is independent of operation of amplifiers 40 or 42 and therefore functions to quiet downstream alarms since other amplifiers 40 and 42 not located adjacent to the cable disruption are still operative along cables 14 and 16.

It therefore can be seen that the present shutdown apparatus for a fiber-optic communications system provides for a fail-safe system to detect an abnormal condition in a cable, shutdown cooperating optical amplifiers until the condition is repaired, and restart the system automatically after the condition is repaired.

Whereas the present invention has been described with respect to specific embodiments thereof, it will be understood that various changes and modifications will be suggested to one skilled in the art and it is intended to encompass such changes and modifications as fall within the scope of the appended claims.

I claim:

1. In a fiber-optic communications system, a shutdown apparatus in the event of a cable disruption, comprising:

a first optical fiber cable for propagating signals in a first direction and having a plurality of adjacent amplifiers disposed along said first optical fiber cable, each amplifier having an input for receiving an optical signal and an output for providing an output optical signal;

a second optical fiber cable for propagating signals in a second direction, opposite said first direction, and having a plurality of adjacent amplifiers disposed along said second optical fiber cable, each amplifier having an input for receiving an optical signal and an output for providing an output optical signal;

each of said amplifiers of said second optical fiber cable being also connected to one of said amplifiers of said first optical fiber cable to form a plurality of amplifier pairs along said first and second optical fiber cables;

means for terminating operation of an amplifier in said first or second optical fiber cables in the event of an optical fiber cable disruption along said first or second optical fiber cables, such that an amplifier within an amplifier pair adjacent to the optical fiber cable disruption terminates generation of the output signal at its output;

means for continuously generating a continuity signal on said first and second optical fiber cables at the output of each of said amplifiers; and means for sensing said continuity signal upon the elimination of the optical fiber cable disruption to thereby activate the input of said amplifier within an amplifier pair adjacent to the optical fiber cable disruption to thereby automatically reestablish communication along the previously disrupted optical fiber cable.

2. The apparatus of claim 1 wherein said means for terminating includes:

means for terminating operation of an amplifier in one of said plurality of amplifier pairs which is disposed in the non-disrupted optical fiber cable of said first or second optical fiber cables, to thereby terminate operation of an amplifier in the non-disrupted optical fiber cable in the amplifier pair adjacent to the disruption.

3. The apparatus of claim 1 wherein said continuity signal further includes a telemetry signal.

4. The apparatus of claim 1 wherein said continuity signal prevents termination of operation of amplifiers disposed within said first or second optical fiber cables which are not adjacent to the optical fiber cable disruption.

5. In a fiber-optic communications system, a shutdown apparatus in the event of a cable disruption comprising:

a first optical fiber cable for propagating signals in a first direction and having a plurality of adjacent amplifiers disposed along said first optical fiber cable, each amplifier having an input for receiving an optical signal and an output for providing an output optical signal;

a second optical fiber cable for propagating signals in a second direction, opposite said first direction, and having a plurality of adjacent amplifiers disposed along said second optical fiber cable, each amplifier having an input for receiving an optical signal and an output for providing an output optical signal;

each of said amplifiers of said second optical fiber cable also being connected to one of said amplifiers of said first optical fiber cable to form a plurality of amplifier pairs along said first and second optical fiber cables;

means for reducing the output signal of an amplifier in said first or second optical fiber cables in the event of an optical fiber cable disruption, such that an amplifier within an amplifier pair adjacent to the optical fiber cable disruption produces a reduced output signal;

means for continuously generating a continuity signal on said first and second optical fiber cables at the output of each of said amplifiers; and means for sensing said continuity signal upon the elimination of the optical fiber cable disruption to thereby increase the output of said amplifier within an amplifier pair adjacent to the optical fiber cable to thereby automatically reestablish communication along the previously disrupted optical fiber cable.

6. The apparatus of claim 5 wherein said means for reducing the output signal includes:

means for reducing the output of an amplifier in one of said plurality of amplifier pairs which is disposed in the non-disrupted optical fiber cable of said first or second optical fiber cables, to thereby reduce the output signal of an amplifier in the non-disrupted optical fiber cable in the amplifier pair adjacent to the disruption.

7. The apparatus of claim 5 wherein said continuity signal further includes a telemetry signal.

8. The apparatus of claim 5 wherein said continuity signal prevents termination of operation of amplifiers disposed within said first or second optical fiber cables which are not adjacent to the optical fiber cable disruption.

9. A method for shutting down a fiber-optic communications system in the event of a cable disruption, comprising the steps of:

providing a first optical fiber cable for propagating signals in a first direction and having a plurality of adjacent amplifiers disposed along the first optical fiber cable, each amplifier having an input for receiving an optical signal and an output for providing an output optical signal;

providing a second optical fiber cable for propagating signals in a second direction, opposite the first direction, and having a plurality of adjacent amplifiers disposed along the second optical fiber cable, each amplifier having an input for receiving an optical signal and an output for providing an output optical signal;

coupling each of the amplifiers of the second optical fiber cable to one of the amplifiers of the first optical fiber cable to form a plurality of amplifier pairs along the first and second optical fiber cables;

terminating operation or reducing power output of an amplifier in the first or second optical fiber cables in the event of an optical fiber cable disruption, such that an amplifier within an amplifier pair adjacent to the optical fiber cable disruption terminates generation of the output signal or reduces power of the output signal;

generating a continuous continuity signal on the first and second optical fiber cables at the output of each of said amplifiers; and sensing the continuity signal upon the elimination of the optical fiber cable disruption to thereby activate the input of the amplifier within an amplifier pair adjacent to the optical fiber cable disruption to thereby automatically reestablish communication along the previously disrupted optical fiber cable.

10. The method of claim 9 wherein the step of terminating operation or reducing power output includes:

terminating operation or reducing power output of an amplifier in one of the plurality of amplifier pairs which is disposed in the non-disrupted fiber optic cable of the first or second optical fiber cables, to thereby terminate operation or reduce power output of an amplifier in the non-disrupted optical fiber cable in the amplifier pair adjacent to the disruption.

11. The method of claim 9 and further including generating a telemetry signal with the continuity signal.

12. The method of claim 9 and further including:

preventing termination of operation of amplifiers disposed within the first or second optical fiber cables which are not adjacent to the optical fiber cable disruption.

13. A method for shutting down a fiber optic communication system in the event of a cable disruption comprising the steps of:

propagating signals in a first directional path at an operational power level;

propagating signals in a second directional path at substantially said operational power level, opposite the first direction;

reducing power levels of the propagating signals in both directions upon the detection of a disruption in one of the propagating signal paths;

continuously transmitting a continuity signal at the reduced power level in both directional paths; and restoring the propagating signals to normal operation power levels when the continuity signal is sensed in both directions.

14. A method for shutting down a fiber-optic communication system comprising pairs of interconnected and communicating optical amplifiers in the system, each amplifier having an input for receiving an optical signal and an output for providing an output optical signal, in the event of an optical signal disruption between amplifiers, the method comprising the steps of:

propagating optical signals at operational power levels in opposite directions between amplifier pairs as part of normal bidirectional communications;

reducing output power levels to a continuity signal power level of both amplifiers of an amplifier pair upon detection of signal disruption at the input of an amplifier; and reactivating both amplifiers of an amplifier pair to operational power levels upon detection of the continuity signal power level at the input of the amplifier previously detecting a signal disruption.

15. A method for minimizing dangerous light level emission from a severed optical cable communication system comprising pairs of interconnected and communicating optical amplifiers in the system in the event of an optical signal disruption between amplifiers, each amplifier having an input for receiving an optical signal and an output for providing an optical signal, the method comprising the steps of:

simultaneously propagating optical traffic signals and a continuous low power continuity signal in opposite directions between amplifier pairs as part of normal bidirectional communications;

eliminating traffic signals between amplifier pairs upon detection of signal disruption at the input of an amplifier while continuing attempted propagation of said continuity signal; and reactivating propagation of said optical traffic signals in both directions upon detection of the continuity signal at the input of the amplifier previously detecting a signal disruption.

16. A method for appropriately reacting to disruption in signal traffic in a fiber optic communications system containing a plurality of pairs of east-west traffic signal regenerators comprising the steps of:

continuously transmitting low power level, as compared to the power level of operational traffic signals, continuity signals downstream;

reducing traffic power transmission levels of signals directed in both of said east and west directions between adjacent signal regenerators upon detection of a lack of continuity signal being received by one of said adjacent signal regenerators; and restoring operational traffic power transmission levels of signals in both directions between the adjacent signal regenerators upon detection of a continuity signal by the adjacent signal regenerator that detected the lack of continuity signal.

* * * * *